United States Patent [19]

Berezoutzky

[11] Patent Number: 4,732,508

[45] Date of Patent: Mar. 22, 1988

[54] SAFETY DEVICE FOR A FILLING TUBE OF AN UNDERGROUND FACILITY FOR STORING LIQUEFIED GAS UNDER PRESSURE

[75] Inventor: Georges Berezoutzky, Cesson, France

[73] Assignee: Societe Francaise de Stockage Geologique-Geostock, Paris La Defense, France

[21] Appl. No.: 896,048

[22] Filed: Aug. 13, 1986

[30] Foreign Application Priority Data

Aug. 13, 1985 [FR] France ................................ 85 12321

[51] Int. Cl.$^4$ ............................................. B65G 5/00
[52] U.S. Cl. ............................................. 405/53; 405/59
[58] Field of Search ................ 405/59, 54, 53; 62/45, 62/51, 260; 137/236.1; 220/18

[56] References Cited

U.S. PATENT DOCUMENTS 3,105,358 10/1963 Reed ........................................ 405/53
4,417,829 11/1983 Berezoutzky ........................... 405/54

Primary Examiner—David H. Corbin
Attorney, Agent, or Firm—Sughrue, Mion, Zinn, Macpeak and Seas

[57] ABSTRACT

A safety device for a tube (8) for inserting or removing a liquid substance for storage in a storage facility in a cavity in a water-impregnated rock mass, said liquid being the liquid phase of a substance which is a gas at ordinary temperature, which liquefies under pressure, which has a density which is less than the density of water and which is immiscible with water, said liquefied gas being stored in said cavity under the liquid-gas equilibrium pressure applicable to the ambient temperature in the cavity, the safety device being constituted by a can (9) which is open at the top and which is disposed around the bottom end (81) of the tube to which it is applicable such that the bottom opening of the tube (8) is located near to the bottom of the can, the volume of the can being greater than the volume of the tube up to a height corresponding to the head of water necessary for reaching an equilibrium pressure with the cavity.

1 Claim, 2 Drawing Figures

SAFETY DEVICE FOR A FILLING TUBE OF AN UNDERGROUND FACILITY FOR STORING LIQUEFIED GAS UNDER PRESSURE

The present invention relates to facilities for storing liquefied gases, e.g. butane and propane, under pressure, in underground cavities formed in water-impregnated rock masses, with the hydrostatic pressure in the cavity being used to balance the liquefication pressure of the gas. The invention relates more particularly to a safety device for a filling tube for such a storage facility.

BACKGROUND OF THE INVENTION

Such a storage facility is used by inserting or removing the stored liquid, and this has the effect of moving the liquid-gas equilibrium surface. The water-liquid phase interface is maintained at a substantially constant level, between two levels which are fairly close together: drainage pumps are put into operation when the water level reaches a predetermined upper limit, and they are stopped when the water-liquid interface has moved down to a predetermined lower limit.

FIG. 1 of the accompanying drawings is a diagrammatic representation of a common variety of such a storage facility. For the purposes of simplifying the vocabulary used in the following description, it is assumed that the stored liquid is butane. However, it must be understood that any other gas which is liquefiable under pressure could similarly be stored, provided the density of the liquid gas is less than the density of water and provided that the liquid gas is not miscible with water.

The storage cavity 1 has a draining well 2 dug in its bottom 3. Four operating ducts are shown diagrammatically: a tube 5 for extracting liquid butane; a tube 6 for pumping out water; a gas vent tube 7 opening out into the top of the cavity; and a tube 8 for inserting liquid butane. The water suction orifice 61 is provided close to the bottom of the draining well, and the (or each) pump is (are) controlled in such a manner as to maintain the water level between two liquid levels: a top limit level Ns and a bottom limit level Ni. This is entirely conventional. The liquid butane suction orifice 51 is placed at a certain depth h down the draining well, but above the top level Ns.

When a storage facility is taken out of use and "mothballed", i.e. put into a condition for safe long term storage without interruption, at least some of the operating tubes are filled with water or the water level is allowed to rise up said tubes, up to a level H such that the system is in hydrostatic equilibrium. In order to perform this operation safely, the butane suction oriface 51 is located in the draining well at a depth h which is sufficient to ensure that the volume of the draining well above the suction oriface is greater than the volume of the column of water in the tube up to its equilibrium height H. If the area of the draining well is S and the area of the (or all of the) filling tubes is s the the depth h is determined by the condition:

$$h.S > H.s$$

Butane is inserted into storage facility via the tube 8 either by pouring from a height when the oriface 81 is situated near the top of the cavity or else by upwelling when the oriface 81 is situated near the bottom of the cavity or in the top of the draining well 2.

If the storage facility is to be mothballed and the filling tube 8 is to be made safe, it is necessary for the oriface 81 to be placed at a certain depth down the draining well, as explained above.

However, for other reasons it is advantageous to be able to fill the facility by pouring from a height, in which case it is desirable for the oriface 81 to be located near the top of the cavity, i.e. in the portion of the cavity which is always filled with the gas phase of the stored substance.

Preferred implementations of the present invention provide a device which allows the stored substance to be poured into the storage facility, while still allowing the, or each, filling tube to be filled with water, for safety purposes, up to a height suitable for providing hydrostatic equilibrium with the equilibrium pressure between the liquid and gas phases of the stored substance at the ambient temperature.

SUMMARY OF THE INVENTION

In accordance with the present invention, the filling tube for the substance to be stored opens out into the bottom of a can which is preferably cylindrical and which is open at the top, which opening is located near the top of the underground storage cavity, i.e. at a level which is preferably never reached by the liquid phase stored in the cavity, and the volume of the can surrounding the portion of the filling tube dipped therein is greater than the volume of water which the tube contains when the water extends to its equilibrium level in order to obtain hydrostatic equilibrium with the pressure in the cavity.

BRIEF DESCRIPTION OF THE DRAWINGS

An embodiment of the invention is described by way of example with reference to the accompanying drawings, in which.

MORE DETAILED DESCRIPTION

Figure 1:
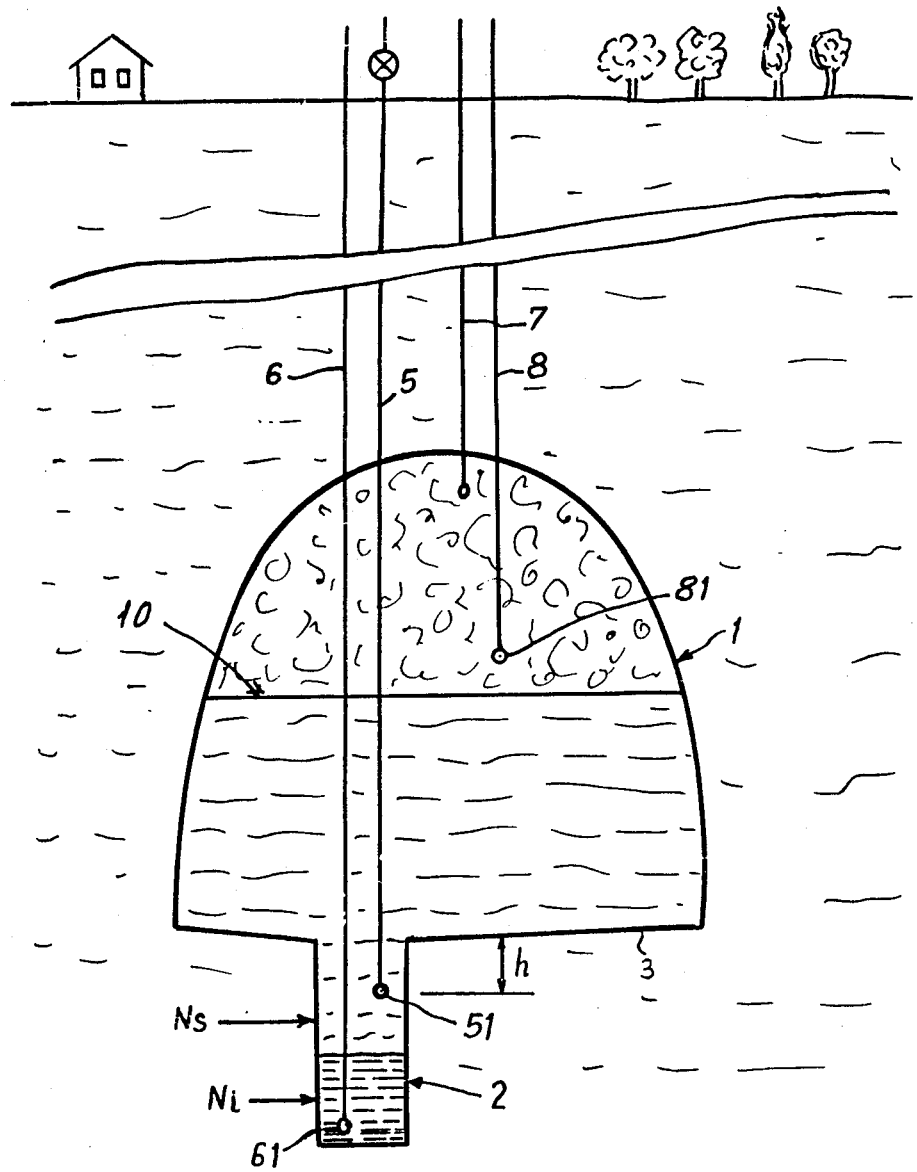
FIG. 1 is a diagrammatic perspective view through a conventional underground storage facility.
Figure 2:
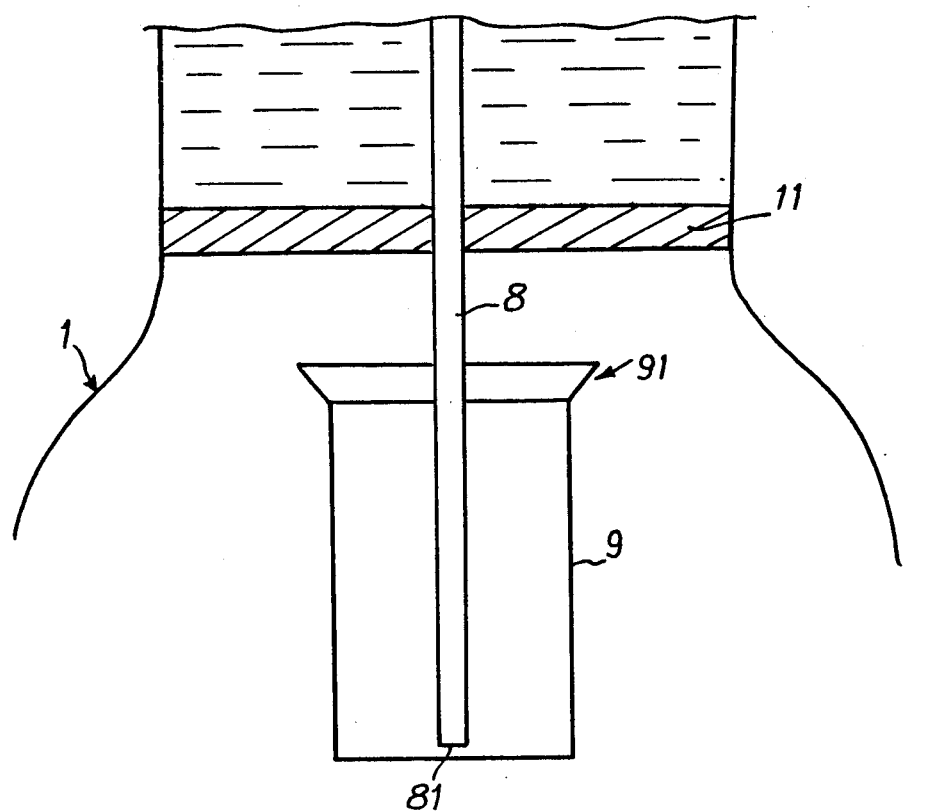
FIG. 2 is a diagrammatic section view through the bottom end of a filling tube for pouring liquid substance to be stored into the cavity.
Figure 2:
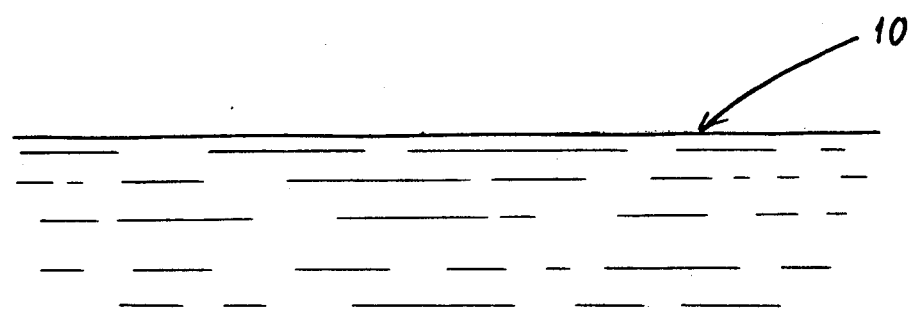

In accordance with the present invention, the bottom end 81 of the filling tube for filling the cavity with liquid substance to be stored opens out into the bottom of a can 9, and the top rim 91 if the can is situated at a level which is higher than the level 10 of the liquid phase. The figure also shows a concrete plug 11 for closing the access well to the cavity 1. The volume of the can is greater than the volume of the tube 8 up to a water height corresponding to the maximum pressure expected in the cavity. Liquid substance is inserted into the cavity by pumping the liquid down the tube 8, and the liquid then rises inside the can 9 around the tube 8 and overflows to pour down from the rim 91 of the can. In order to "mothball" the cavity, water is pumped down the tube 8 until the can 9 is full. At this point a valve is opened at the top of the tube 8 and the system is left to reach equilibrium. Since the can 9 is full of water, it is certain that the pressure of gas at the surface of the water which may possibly force the water up the tube 8 depending on the depth of water therein is in no danger of emptying the can 9 so there is no danger of the stored liquid reaching the bottom end of the tube 8 and entering therein. This ensures hydrostatic equilibrium.

The above example relates to a tube for filling the storage facility with a liquefied substance. It will be understood that a similar device could be mounted at the end of a suction tube provided that the rim 91 of the can remains at a level which is always immersed in the liquid phase of the substance to be stored.

I claim:

1. A safety installation for a vertically oriented tube (8) for inserting a liquid substance for storage in an underground cavity (1) defined in a water-impregnated rock mass, said liquid being a liquid phase of a substance which is a gas at ordinary temperature, which liquefies under pressure, which has a density less than the density of water, and which is immiscible with water, said liquefied gas being stored in said cavity under a liquid-gas equilibrium pressure applicable to the ambient temperature in the cavity, said safety installation being characterized by: a bottom, open outlet end (81) of the tube being disposed in an upper, gaseous phase portion of the cavity, and above a level (10) of the liquid stored in the cavity, and a can (9) open at a top thereof and disposed around the bottom end of the tube such that said bottom end is disposed proximate a bottom of the can, the volume of the can above said bottom end of the tube being greater than the volume of the tube up to a height corresponding to a head of water necessary for reaching an equilibrium pressure with the cavity.

* * * * *